Figure 1:
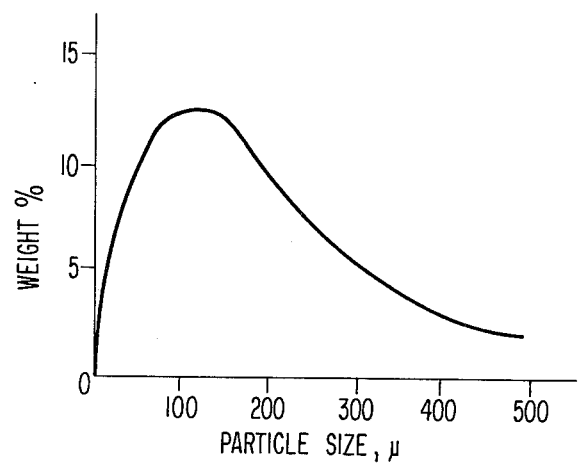

United States Patent [19]

Eckerbom et al.

[11] 3,963,517

[45] June 15, 1976

[54] PROCESS FOR THE MANUFACTURE OF LEAD STORAGE BATTERY ELECTRODES AND APPARATUS FOR CARRYING OUT THE PROCESS

[75] Inventors: Gunnar Eckerbom, Kungalv; Ove Nilsson, Nol, both of Sweden

[73] Assignee: Aktiebolaget Tudor, Stockholm, Sweden

[22] Filed: May 30, 1974

[21] Appl. No.: 474,675

[30] Foreign Application Priority Data

June 1, 1973 Sweden .......................... 73077596

[52] U.S. Cl. .................................. 136/27; 136/33
[51] Int. Cl.² ...................................... H01M 39/00
[58] Field of Search .......................... 136/27, 26, 33; 423/619; 23/277 R; 34/165, 168

[56] References Cited
UNITED STATES PATENTS

| | | | |
|---|---|---|---|
| 385,235 | 6/1988 | Bradley | 423/620 |
| 1,979,745 | 11/1934 | Ishimura | 423/619 X |
| 2,835,719 | 5/1958 | Bazalgette | 136/27 |
| 3,449,166 | 6/1969 | Jache | 136/27 |

*Primary Examiner*—Anthony Skapars
*Attorney, Agent, or Firm*—Burns, Doane, Swecker & Mathis

[57] ABSTRACT

Greater uniformity of particle size and free-running properties are achieved in the production of granular material for lead storage battery electrodes by adding water or sulfuric acid to a mixture of granules of lead and lead oxide to produce a paste which is pressed through a foraminous body such as a filter cloth and the resulting granules dried by permitting free fall through a heated gaseous drying medium. Novel apparatus for carrying out the process is also disclosed.

7 Claims, 2 Drawing Figures

PROCESS FOR THE MANUFACTURE OF LEAD STORAGE BATTERY ELECTRODES AND APPARATUS FOR CARRYING OUT THE PROCESS

The present invention relates to a method and apparatus for manufacture of lead storage battery electrodes involving granulation of active material for such electrodes.

In the commercial production of one kind of storage battery, an active material in dry granular form, mainly comprising lead oxides, is used primarily for the manufacture of so-called "tube electrodes." Such electrodes usually consist of a plurality of tubes, in the center of which a conductive rod is formed, suitably of lead or lead alloy. The rods are joined at the top with a strip of the same lead or lead alloy. Each rod is surrounded by active material which in turn is surrounded by a sheath of inactive porous material. At the bottom, this tube sheath is sealed and joined by a bottom strip, suitably of plastic. The usual method of manufacture of such electrodes is first to cast a grid consisting of electric conductors and the common strip. On this grid there are then set the inactive tube sheaths, whereafter the active granular material is charged in, and the bottom strip is set on.

Many methods for the preparation of granular, active material are known. One such method is to spray water, with vigorous agitation, on an oxidized lead material, whereby an agglomerate is formed. To obtain the required properties in the product, sulfuric acid or readily volatilized liquids, such as acetone and alcohol, can be added. The agglomerate thus formed is dried, for example, in a rotating vacuum dryer. It is also known to prepare granular material by spraying water and sulfuric acid on the lead, with drying in a fluidized bed. Another method is known whereby the dry material is mixed with two substances of different volatilities, e.g., camphor in alcohol, and thereafter the mixture is pressed through a filter cloth of suitable mesh size.

The first described known procedures have certain disadvantages. Thus, in using rotary dryers or fluidized beds, the agitated particles constantly collide, with the result that abrasion takes place. This results in a mass which contains large amounts of fine particles as well as large agglomerates produced by the clumping together of the drying particles during agitation. Furthermore, because of agglomeration, a longer drying time is required for the oversize particles.

The production of a granular mixture containing excessive amounts of fine particles on the one hand and large agglomerates on the other, yields a material which not only is free-flowing for proper filling, but tends to clog the electrodes and prevent efficient transfer of electrolyte. Furthermore, the wide range of particle sizes produced by the prior art methods has the effect of decreasing the proportion of particles of the size required for greatest efficiency of operation of the batteries ultimately manufactured from the electrode material.

Accordingly, it is an object of the present invention to provide a method for producing granular active materials for use in tubular electrodes whereby the production of excessive amounts of clogging, fine particles is minimized.

Another object is to provide a method which also minimizes the production of excessively large agglomerates.

A further object is to provide such a method whereby a granular product is obtained which has a particle size distribution within the range of sizes required for the greatest efficiency of operation of the batteries having electrodes which incorporate the granular material produced in accordance with the present invention.

Still another object of the present invention is to provide apparatus whereby the process can be carried out quickly and efficiently.

These and other objects, which will be apparent to those skilled in this art, are achieved in accordance with the present invention.

Figure 2:
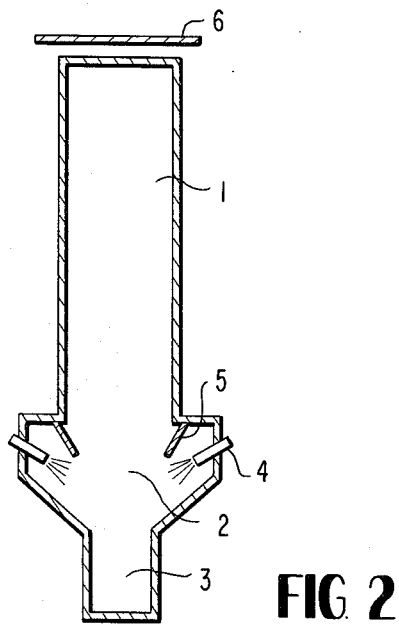

In order that the invention may be readily understood, reference is made to the description which follows and to the accompanying drawings in which:

FIG. 1 is a particle size distribution curve for granules produced according to the process of this invention; and FIG. 2 is a schematic representation of a preferred form of apparatus for carrying out the inventive process.

In the preparation of granules according to the process of the present invention, one starts with a material comprising lead and lead oxide prepared in a manner familiar to those skilled in the art. The metallic lead contact in such material may amount to as much as about 30%. This material is mixed with water and possibly with some sulfuric acid. The amount of sulfuric acid added is determined by the properties sought in the final product. The sulfate content in the final product can amount to as much as 40% lead sulfate. The moist mass obtained in the mixing is then pressed through a filter cloth, whose mesh width must be such that the greatest particle size has a diameter of about $500\mu$. After being pressed through the cloth, the particles are dried during free fall in an upward flowing hot gas. Since it is desirable, with a certain metallic lead content in the final product, that the drying gases not be oxidizing, hot combustion gases are especially suitable. The gas temperature must be 350°–450°C. To be certain of avoiding undesired oxidation of the material, drying should occur in combustion gases that do not contain more than 2% $O_2$.

Drying during free fall offers substantial advantages, as compared with earlier known methods, primarily because the particles are not abraded against each other as in the earlier methods, with rotary dryers of fluidized beds. There is the further advantage in that the whole surface of each particle is exposed to the drying gases and drying is therefore rapid. The method is also simple to regulate and execute practically. Because abrasion of the particles is avoided, particle size is not changed after the particles pass through the filter cloth, and formation of small clogging grains, or clumping together into large agglomerates, is avoided. This is important on the one hand with reference to the problem entailed when there is clogging material, and on the other hand with reference to the requirement that there be specific limits of particle size distribution, in order to have the desired free running properties in the product. Particle size must be no greater than $500\mu$, preferably around $100\mu$, and at no more than 10% smaller than $45\mu$. requirement is easily met with the process of the invention, and a typical particle size distribution curve is presented in FIG. 1.

In FIG. 2, there is shown a schematic representation of a preferred apparatus for carrying out the process.

The apparatus comprises a drying tower with three zones, where the uppermost is a vertical dryin zone, then a combustion zone disposed outside said drying zone, and finally, at the bottom, a collecting zone where the product is taken up. Use of gas burners directly in the drying tower for generation of the drying gases has been shown to involve special problems that are solved by the device of the invention. The combustion zone is placed outside the lower part of the drying zone, and the burners are directed somewhat at a downward slant. A shield is placed between the drying zone and the combustion zone, whereby the combustion gases are directed downward, and the gases from a plurality of burners disposed in the zone meet in the drying zone at a level that is lower than that of the burners. The shield prevents the lead material from falling in toward the burners and collecting in the combustion zone.

The invention is further demonstrated by the following example which, as will be recognized by those skilled in the art, is merely illustrative, but does not constitute a limitation on the scope of the invention.

EXAMPLE 75 kg lead material containing 73% PbO and 27% Pb was mixed in a kneader with 15 liters sulfuric acid, of density 1.285 g/cc. The mass thus obtained was pressed through a filter cloth and permitted to fall freely through a drying zone about 4 m long, at an average temperature of 400°C. The product that was obtained contained 27.4% $PbSO_4$ and 7.3% Pb, the whole having a fall weight (Scott number) of 240. On electrodes made of this material, an active material density of 2.97 g/cc was determined.

By preparing granulated active material according to the invention, there is obtained an active material that comprises a free running agglomerate of smaller particles. The particle size of the agglomerate can be obtained, in accordance with the method of the invention, within specific and reproducible given limits, which on the one hand are a condition for actual free running of the material, and on the other hand for freedom from clogging of the lead. The material is also easily transported, e.g., by a screw conveyor or by blowing through conduits. Because the material is free running, it is easier to fill the electrode sheaths and there is more uniform filling; this in turn imparting a more even current distribution in the working electrode than what could be attained before. By a suitable selection of starting material and process conditions, there can also be attained a controlled density in the granular material. Finally, it is possible to avoid so-calld sulfatation of the filled electrodes, i.e., dipping in sulfuric acid with subsequent drying. Sulfatation has as its purpose partly to bind the active material in the electrodes so that clogging is avoided, and on the other hand, to give the active material a suitable chemical composition for the continued processes. The requirement can now be met by the active material, even when it is put into the electrodes.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. A method for producing active granular material for lead storage battery electrodes which comprises forming a paste from a moistened mixture of lead and lead oxide particles, forcing the resulting paste through a foraminous body, an drying the resulting granular material during free fall.

2. A process as in claim 1 wherein the mixture of lead and lead oxide is moistened with water.

3. A process as in claim 1 wherein the mixture of lead and lead oxide is moistened with an aqueous solution of sulfuric acid.

4. A process as in claim 1 wherein drying occurs in a nonoxidizing atmosphere.

5. A process as in claim 4 wherein the nonoxidizing atmosphere comprises hot combustion gases.

6. A process as in claim 5 wherein the hot combustion gases contain a maximum of 2% oxygen.

7. A process as in claim 5 wherein drying takes place at a temperature of about from 350° to 450°C.

* * * * *